Oct. 20, 1936.  F. H. JUNE, JR  2,058,084
LIGHT SHIELD
Filed May 20, 1936
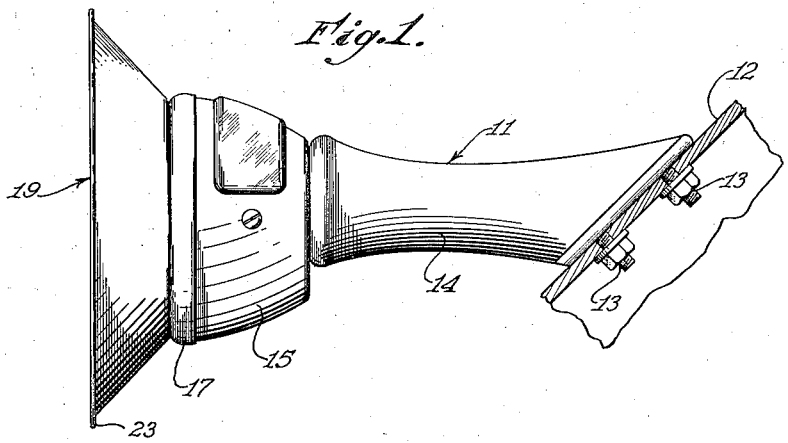
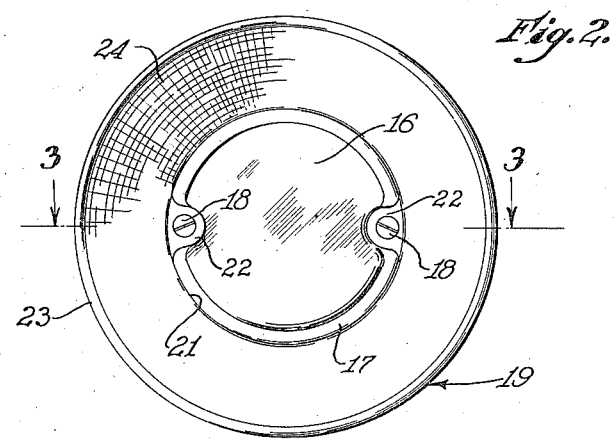
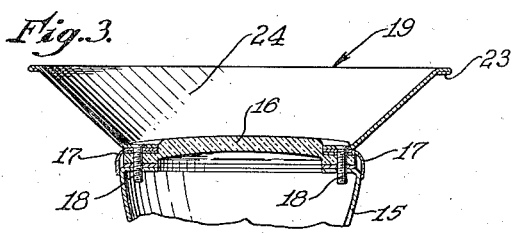
INVENTOR.
Frank H. June, Jr.
BY
Rasmussen & Brugman
ATTORNEYS.

Patented Oct. 20, 1936

2,058,084

UNITED STATES PATENT OFFICE 2,058,084

LIGHT SHIELD

Frank H. June, Jr., Oak Park, Ill.

Application May 20, 1936, Serial No. 80,704

1 Claim. (Cl. 240—8.3)

This invention relates in general to attachments for the rear lights of vehicles, and more particularly to a reflecting and protective shield therefor.

A principal object of the invention is the provision of a shield adapted to be attached to the rear light of a vehicle to prevent the accumulation of road dirt and other foreign matter on the lens of the light.

Another important object of the invention is the provision of such a shield which has the further function of greatly increasing the visibility of the light by increasing its effective intensity by reflecting light rays to the rear that would otherwise be diffused to the side of the vehicle.

A further important object of the invention is the provision of such a shield which increases the daytime efficiency of the light by shielding the lens so that it will not reflect the rays of the sun.

Numerous other objects and advantages of the invention will be apparent as it is better understood from the following description, which, when taken in connection with the accompanying drawing, discloses a preferred embodiment thereof.

In the drawing,

Figure 1 is a side elevation of a rear light of a vehicle, having a shield embodying the features of the instant invention mounted thereon with the supporting member for the light shown in section;

Fig. 2 is a rear elevational view taken from the left of Fig. 1; and

Fig. 3 is a horizontal sectional view taken substantially on the line 3—3 of Fig. 2.

Referring more particularly to the drawing, reference numeral 11 indicates in general a rear light assemblage for a vehicle which is mounted on a rear fender 12, or other suitable portion of the vehicle, by bolts 13. The light assemblage 11 is of well known construction, and comprises a bracket 14, upon the free end of which is mounted a housing 15 for the light proper. The usual lens 16 is mounted on the rear end of the housing 15 by a retaining ring 17 and a pair of screws 18 extending therethrough into threaded engagement with the housing 15.

A dish shaped or flared shield, indicated generally by reference numeral 19, is provided at its smaller end with a substantially circular aperture 21 of slightly smaller diameter than the retaining ring 17.

Extending inwardly from the side walls of the aperture 21 are a pair of diametrically opposed ears 22 formed integrally with the body portion of the shield 19. Each of the ears 22 is provided with a suitable aperture through which a screw 18 may extend to secure the shield 19 against the retaining ring 17.

Since the lens 16 is normally recessed adjacent the screws 18, no alterations of the usual light structure are necessary in order to attach the shield 19 thereto, such recesses in the lens 16 providing clearance for the ears 22. The outer marginal edge of the shield 19, being that edge of the larger diameter, may terminate in a rolled-back, beaded portion 23. The inner surface of the shield 19, as indicated at 24, is finished in some suitable manner to provide a light reflecting surface, such as by applying a coating of white enamel thereto. The shield 19 is preferably formed from light gauge metal by spinning or stamping.

With the above described arrangement of the shield 19 mounted on the rear face of the light assemblage 11, it will be readily apparent that the accumulation of road dirt or other foreign matter on the outer surface of the lens 16 will be effectively prevented. In addition to this function, the inner light reflecting surface 24 of the shield will greatly increase the visibility of the light both at night and in the daytime. By reflecting light rays to the rear of the vehicle which would otherwise be diffused sidewards, the shield increases the effective intensity of the light, and makes it appear as a larger light, which increases its visibility, especially at night. In the daytime the shield prevents the lens of the light from reflecting the rays of the sun, thereby greatly increasing the efficiency of the light. This feature is of particular importance when the customary reflex type of lens is used.

If it is desired, the shield 19 may be formed integrally with the retaining ring 17 or the housing 15. Such constructions would be particularly applicable where the shielded light is used as standard equipment.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In combination with a tail lamp of a motor vehicle, having a housing, a lens with recesses in its outer surface, and means co-operating with the recesses of said lens for securing the lens to said housing; a circular, flared shield projecting outwardly from the lamp, the smaller end of said shield being of slightly larger diameter than the effective part of said lens, and ears extending inwardly from the smaller end of said shield into the recesses in said lens and secured to the housing by said lens securing means, the inner surface of said shield having light reflecting characteristics so as to increase the visibility of said tail lamp.

FRANK H. JUNE, Jr.